Figure 1:
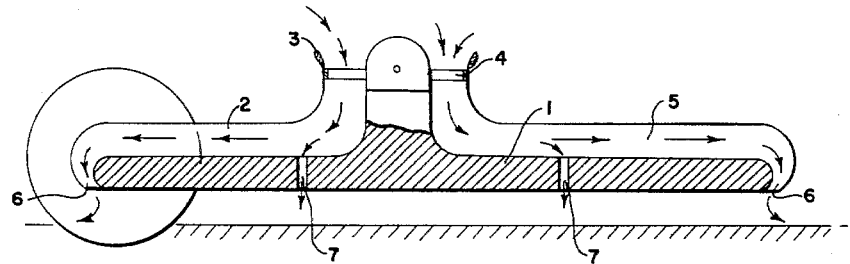

May 24, 1966  R. S. JONES  3,252,535

GROUND EFFECT VEHICLES

Filed March 22, 1962

INVENTOR
RICHARD S. JONES

BY Larson and Taylor

ATTORNEYS

United States Patent Office 3,252,535
Patented May 24, 1966

3,252,535
GROUND EFFECT VEHICLES
Richard Stanton Jones, Cowes, Isle of Wight, England, assignor to Westland Aircraft Limited, Yeovil, Somerset, England
Filed Mar. 22, 1962, Ser. No. 181,758
2 Claims. (Cl. 180—7)

This invention relates to ground effect machines, that is to say those which are supported during one phase of their operation by a cushion of pressurized air or gas which is generated between the base platform structure and the surface over which the machine is hovering or moving. The air cushion is maintained, by pressure air feed, at a pressure which is greater than the pressure of the environmental air.

One of the problems encountered in the operation of such machines is that of retarding the outward escape of air from the pressurized cushion, so that, for a minimum expenditure of power to maintain and create the air feed, the optimum weight support, surface clearance or altitude can be obtained. The problem is most important in relation to economical operation since not only does the rate at which the air escapes from the cushion determine the minimum power requirements, it also governs the ground or water clearance such machines can attain and thus the surface conditions over which they can be operated without the hazard of damage to the lower structure.

To overcome these problems, simple types of flexible "skirts" attached at their upper ends to the lower periphery of the machine, as a series of hinged plates forming the skirt, have already been proposed.

One of our objects in this invention concerns the provision of new arrangements for retarding the outward escape of air from the pressurized air cushion particularly in relation to ground effect machines which embody the peripheral jet system. However, the arrangements of the invention can also be applied to machines in which the ground effect is obtained by air cushion compartmentation, plenum chamber, or by a labyrinth seal principle.

Another object of this invention is to provide an arrangement which acts not only as an impact absorber, but also as an "at rest" support for the machine on land or an additional buoyancy chamber when it is floating on the water.

Yet another object of the invention is to provide an arrangement which provides a flexible jet nozzle through which a pressure air jet can be discharged and build up the pressurized air cushion beneath the machine.

According to one feature of the present invention a ground effect machine is characterized by the provision of a flexible barrier to the outward escape of air from the pressurized air cushion, the barrier being located a predetermined distance within the periphery of the base and extending downwardly between the generated air cushion and an outer stage of a downward air jet which is used to generate, maintain or stabilize the cushion pressure. In this way, a more positive retarding action is exerted against outward escape of pressure air from the air cushion, in that the space between the bottom edge of the barrier and the surface over which the machine is operating will be subjected to the turbulent area of the jet as it strikes the surface, and the jet will not entrain so much of the air forming the cushion during its downward passage from the base structure of the vehicle to the operating surface since the barrier constitutes a positive pressure separator. It will be understood, that the downward jet is at a higher pressure than that maintained in the air cushion. This arrangement may advantageously be used for peripheral-jet, labyrinth-seal, or cushion compartmentation machines, since the invention provides a barrier arrangement which provides a downward extension to the inner walls of stability or other pressure jets located around and under the base of the machine, to retard the escape of the pressurized air cushion.

According to another feature of the invention a ground effect machine of the peripheral type is provided with an annular flexible barrier which depends downwardly from the base structure of the machine, the barrier being operative to retard the escape of air from the pressurized air cushion built up beneath the machine and forming the inner wall, or an extension thereto, of the peripheral air-jet discharge orifice through which air, at a greater pressure than that of the air cushion, is downwardly discharged for the purpose of building up and maintaining the cushion pressure. The performance is improved when the lower end of the barrier is inwardly inclined although at that part of the machine forming the stem it may be outwardly inclined and in this connection and in accordance with another feature of the invention, the barrier is complementary to an outer flexible barrier depending from the periphery of the base structure of the machine, said double barrier forming a flexible peripheral jet nozzle through which the peripheral air jet is discharged. The diaphragms are provided to maintain positional relationship between the barriers. The inner barrier can be constructed so that it contains an internal air chamber which acts as a buffer against impact and this may be inflated by communication with the pressure air feed or, and preferably, is sealed and provided with valves through which it is inflated so that it acts as an inflated annular tire upon which the machine rests on landing, or as an additional buoyancy chamber when the machine is floating.

Figure 2:
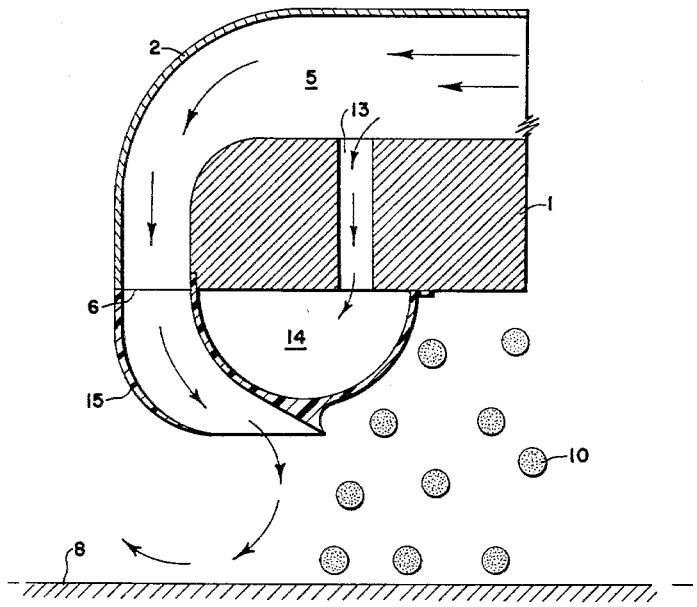

Other objects and many of the attendant advantages of the present invention will become apparent upon consideration of the following detailed specification wherein:

FIG. 1 is a diagrammatic section of a typical ground effect machine and FIG. 2 is an enlarged section through one edge of the peripheral jet shown circled in FIG. 1.

Referring now more specifically to the drawing, the ground effect machine illustrated comprises a structure 1, the upper parts of which are enclosed by an outer casing 2. The lower edge of the outer casing 2 forms the periphery of the base structure of the machine. The top center portion of casing 2 constitutes an air intake 3, in which a compressor 4 generates compressed air and drives it through a duct 5, terminating in a peripheral jet nozzle 6. A secondary stabilizing jet 7 is additionally connected to the duct 5. The ground or water line in indicated by the hatched line beneath the machine.

In FIG. 2 it can be seen that the jet 6 is extended by a skirt, the skirt being made of a flexible material such as rubber, rubberized fabric or the like. There is provided an inflatable air cushion 14, the outer wall of which forms an extension of the inner wall of the jet. It is inflated by air under pressure in the duct 5 by way of a tapping 13. There is provided a flexible projection on the lower edge of the air cushion which serves as an extension on the inner wall of the jet.

The outer wall of the jet is extended by means of flexible skirt 15. The parts 14 and 15 cooperate to constitute a single flexible skirt formed by two cooperating lengths of flexible material spaced apart to form an air channel and flexible jet nozzle combined. The jet nozzles terminate beneath the air chamber 14, and the nozzles fold and close upon landing the ground effect vehicle, while the air chamber acts as a buffer against impact. The air chamber will be depressurized subsequent to folding the flexible means and closing of the jet nozzles.

Obviously, many modifications and variations of the present invention are possible in light of the foregoing teachings. What is claimed as new and is desired to be secured by Letters Patent is:

1. In a ground effect vehicle, a base, a jet system for generating a pressurized air cushion beneath said base, said jet system including a plurality of jet nozzles disposed on the periphery of the base, said jet nozzles having inner and outer walls and being entirely disposed within the boundary defined by the periphery of the base to direct a downward stream of air, and a barrier mounted on the underside of the base, said barrier comprising an integrally formed air chamber and the outer wall of the barrier forming a depending extension of the inner wall of the jet nozzles, first flexible means forming an extension of the inner wall of the jet nozzles beneath a plane formed by the lower edges of the air chamber, second flexible means forming an extension of the outer wall of the jet nozzles, said first and second flexible means adapted to fold to close the jet nozzles upon landing the ground effect vehicle and the air chamber acting as a buffer against impact, the air chamber being depressurized subsequent to folding of the flexible means and closing of the jet nozzles.

2. In a ground effect vehicle according to claim 1 and further including air ducts to supply air to the jet system and passageway means interconnecting the air ducts and the air chamber.

References Cited by the Examiner
FOREIGN PATENTS

| | | |
|---|---|---|
| 1,238,499 | 7/1960 | France. |
| 1,263,704 | 5/1961 | France. |
| 1,272,678 | 8/1961 | France. |
| 232,436 | 2/1961 | Australia. |

OTHER REFERENCES

"Aerodynamic Characteristics of a 3-Foot Powered Annular Jet Model," by Arthur E. Johnson (Navy Dept., David Taylor Model Basin), Oct. 22, 1959.

MILTON BUCHLER, *Primary Examiner.*

PHILIP ARNOLD, A. HARRY LEVY, *Examiners.*

R. M. WOHLFARTH, L. C. HALL, *Assistant Examiners.*